(12) United States Patent
Hill et al.

(10) Patent No.: US 11,099,085 B2
(45) Date of Patent: Aug. 24, 2021

(54) OPTIC FIBRES AND FIBRE OPTIC SENSING

(71) Applicant: Optasense Holdings Limited, Farnborough (GB)

(72) Inventors: David John Hill, Dorchester (GB); Magnus McEwen-King, Farnborough (GB); Roger Ian Crickmore, Dorchester (GB)

(73) Assignee: Optasense Holdings Limited, Hampshire (GB)

( * ) Notice: Subject to any disclaimer, the term of this patent is extended or adjusted under 35 U.S.C. 154(b) by 206 days.

(21) Appl. No.: 15/620,196

(22) Filed: Jun. 12, 2017

(65) Prior Publication Data
US 2017/0343433 A1 Nov. 30, 2017

Related U.S. Application Data

(63) Continuation of application No. 13/509,425, filed as application No. PCT/GB2010/002074 on Nov. 11, 2010, now Pat. No. 9,677,956.

(30) Foreign Application Priority Data

Nov. 13, 2009 (GB) .................................... 0919902

(51) Int. Cl.
*G01L 1/24* (2006.01)
*G02B 6/02* (2006.01)
(Continued)

(52) U.S. Cl.
CPC ............ *G01L 1/243* (2013.01); *G01D 5/3538* (2013.01); *G01H 9/004* (2013.01); *G01L 11/025* (2013.01);
(Continued)

(58) Field of Classification Search
CPC .................................. G02B 6/00; G01L 1/243
(Continued)

(56) References Cited

U.S. PATENT DOCUMENTS

| 4,110,554 A | * | 8/1978 | Moore | .................. | D07B 1/147 |
| | | | | | 174/101.5 |
| 4,634,217 A | * | 1/1987 | Levacher | ............. | G02B 6/4432 |
| | | | | | 250/227.16 |

(Continued)

FOREIGN PATENT DOCUMENTS

| CN | 1410788 | 4/2003 |
| GB | 2 168 807 | 6/1986 |

(Continued)

OTHER PUBLICATIONS

U.S. Appl. No. 13/509,415, filed May 11, 2012 entitled: Fibre Optic Distributed Sensing.
(Continued)

*Primary Examiner* — Kaveh C Kianni
(74) *Attorney, Agent, or Firm* — McDonnell Boehnen Hulbert & Berghoff LLP

(57) ABSTRACT

Fiber optic cables with improved performance for use in distributed sensing, for instance in distributed acoustic sensors, are disclosed. In one embodiment a fiber optic cable (210) comprises a core (208) and cladding (206) disposed within a buffer material (202) surrounded by a jacket (204) and arranged so that the core is offset from the center of the cable. By offsetting the core from the center of the jacket any bending effects on the core can be maximized compared to the core being located at the center of the cable.

1 Claim, 3 Drawing Sheets

(51) Int. Cl.
*G01D 5/353* (2006.01)
*G01H 9/00* (2006.01)
*G01L 11/02* (2006.01)
*G02B 6/44* (2006.01)
*G02B 6/032* (2006.01)
*G01V 1/52* (2006.01)
*G01V 1/20* (2006.01)

(52) U.S. Cl.
CPC .............. *G02B 6/02* (2013.01); *G02B 6/443* (2013.01); *G01V 1/208* (2013.01); *G01V 1/52* (2013.01); *G02B 2006/0325* (2013.01)

(58) Field of Classification Search
USPC .......................................................... 73/655
See application file for complete search history.

(56) References Cited

U.S. PATENT DOCUMENTS

| | | | | |
|---|---|---|---|---|
| 4,645,298 A * | 2/1987 | Gartside, III | ........ | G02B 6/4401 385/103 |
| 4,772,089 A * | 9/1988 | Ide | ................ | G02B 6/4429 385/110 |
| 4,784,454 A * | 11/1988 | Dyott | .................. | C03B 37/027 359/489.01 |
| 4,815,079 A * | 3/1989 | Snitzer | ................ | H01S 3/06708 372/6 |
| 4,949,038 A * | 8/1990 | Birch | .................... | C03B 37/027 250/227.17 |
| 5,194,847 A | 3/1993 | Taylor et al. | | |
| 5,307,436 A * | 4/1994 | Berkey | ............. | C03B 37/01211 385/123 |
| 5,367,376 A | 11/1994 | Lagakos et al. | | |
| 5,390,273 A * | 2/1995 | Rahman | ............... | G02B 6/4403 385/112 |
| 5,448,670 A | 9/1995 | Blew et al. | | |
| 5,905,834 A * | 5/1999 | Anderson | .............. | G02B 6/441 385/111 |
| 6,041,149 A * | 3/2000 | Monte | ............... | C03B 37/01234 359/245 |
| 6,073,465 A * | 6/2000 | Oleskevich | ....... | C03B 37/01234 65/390 |
| 6,115,522 A | 9/2000 | Tachikura et al. | | |
| 6,134,356 A | 10/2000 | Monte | | |
| 6,304,352 B1 * | 10/2001 | Cunningham | ..... | H04B 10/2581 398/139 |
| 6,343,174 B1 * | 1/2002 | Neuberger | ............. | A61B 18/22 385/117 |
| 6,380,534 B1 | 4/2002 | Farhadiroushan et al. | | |
| 6,609,834 B2 | 8/2003 | Cunningham et al. | | |
| 6,621,951 B1 * | 9/2003 | Zhao | ........................ | G02B 6/30 385/15 |
| 6,742,936 B1 * | 6/2004 | Knecht | ................ | G02B 6/3833 385/52 |
| 6,909,823 B1 * | 6/2005 | Sorin | ...................... | G02B 6/022 385/10 |
| 6,937,325 B2 | 8/2005 | Ingles et al. | | |
| 7,082,241 B2 * | 7/2006 | Jamet | .................. | G02B 6/4438 385/100 |
| 7,092,586 B2 | 8/2006 | Vokey et al. | | |
| 7,120,324 B2 | 10/2006 | Murphy et al. | | |
| 7,333,681 B2 | 2/2008 | Murphy et al. | | |
| 7,376,293 B2 | 5/2008 | Murphy et al. | | |
| 7,403,674 B2 | 7/2008 | Murphy et al. | | |
| 7,403,675 B2 | 7/2008 | Murphy et al. | | |
| 7,590,321 B2 * | 9/2009 | Lu | ........................ | G02B 6/4475 385/104 |
| 7,609,925 B2 * | 10/2009 | Gronvall | ............. | G02B 6/4472 385/100 |
| 7,760,771 B2 | 7/2010 | Salokatve et al. | | |
| 7,860,361 B2 * | 12/2010 | Ginocchio | ........... | G02B 6/4494 385/102 |
| 7,865,044 B2 | 1/2011 | Farhadiroushan | | |
| 8,750,665 B2 * | 6/2014 | Testu | .................. | G02B 6/4495 385/102 |
| 8,831,389 B2 * | 9/2014 | McCullough | ............ | H01B 7/14 385/101 |
| 9,677,956 B2 | 6/2017 | Hill et al. | | |
| 2002/0021469 A1 | 2/2002 | Cunningham et al. | | |
| 2002/0191928 A1 * | 12/2002 | Carter | .................. | C03C 25/105 385/127 |
| 2002/0197039 A1 * | 12/2002 | Carter | ............... | C03B 37/01294 385/127 |
| 2003/0118296 A1 * | 6/2003 | Smith | .................. | G02B 6/4432 385/102 |
| 2003/0215198 A1 * | 11/2003 | Newton | ............... | G02B 6/4413 385/113 |
| 2004/0037496 A1 * | 2/2004 | Pierce | .................. | G02B 6/4206 385/28 |
| 2004/0129083 A1 * | 7/2004 | Fernald | ................. | G01L 11/025 73/705 |
| 2004/0150811 A1 * | 8/2004 | Ingles, Jr. | .............. | G01M 11/37 356/73.1 |
| 2005/0221709 A1 * | 10/2005 | Jordan | ...................... | D01F 8/06 442/328 |
| 2005/0226548 A1 * | 10/2005 | Durkin | .................. | G01N 21/31 385/12 |
| 2006/0002649 A1 * | 1/2006 | Murphy | ................. | G02B 6/262 385/12 |
| 2006/0002650 A1 | 1/2006 | Vokey et al. | | |
| 2006/0010921 A1 | 1/2006 | Mori et al. | | |
| 2006/0024001 A1 * | 2/2006 | Kobayashi | ............. | G02B 6/381 385/50 |
| 2006/0239610 A1 * | 10/2006 | Hickey | ................. | H01S 3/0675 385/28 |
| 2007/0086693 A1 * | 4/2007 | Murphy | ............... | G02B 6/2852 385/12 |
| 2007/0092176 A1 * | 4/2007 | Murphy | ............... | H04B 10/077 385/13 |
| 2007/0116400 A1 * | 5/2007 | Murphy | ............... | G08B 13/186 385/12 |
| 2007/0133922 A1 * | 6/2007 | Murphy | ................. | G02B 6/421 385/12 |
| 2008/0025363 A1 * | 1/2008 | Yla-Jarkko | ........ | G02B 6/03611 372/98 |
| 2008/0124032 A1 * | 5/2008 | Horvath | ............... | G02B 6/4478 385/76 |
| 2008/0217303 A1 * | 9/2008 | Blagrave | ................. | G02B 6/2553 219/121.45 |
| 2008/0717303 | 9/2008 | Blagrave | | |
| 2009/0252464 A1 * | 10/2009 | Stoesz | ................ | G02B 6/02209 385/100 |
| 2011/0274397 A1 * | 11/2011 | Weimann | ............ | C03C 25/1065 385/123 |

FOREIGN PATENT DOCUMENTS

| | | |
|---|---|---|
| GB | 2 442 745 | 4/2008 |
| WO | WO88/04032 | 6/1988 |
| WO | WO 02/057805 | 7/2002 |
| WO | WO 03/050576 | 6/2003 |

OTHER PUBLICATIONS

Preliminary Amendment filed May 11, 2012 in U.S. Appl. No. 13/509,415.
Unpublished U.S. Appl. No. 13/509,402, filed May 11, 2012 entitled: Improvements in Distributed Fibre Optic Sensing.
Preliminary Amendment filed May 11, 2012 in U.S. Appl. No. 13/509,402.
Unpublished U.S. Appl. No. 13/509,407, filed May 11, 2012 entitled: Improvements in Distributed Sensing.
Preliminary Amendment filed May 11, 2012 in U.S. Appl. No. 13/509,407.

* cited by examiner

OPTIC FIBRES AND FIBRE OPTIC SENSING

This is a continuation of U.S. patent application Ser. No. 13/509,425 filed on May 11, 2012, which is a 371 application of PCT/GB2010/002072 filed on Nov. 11, 2011, which in turn claims priority to GB 0919902.7 filed on Nov. 13, 2009, the specifications of each of which are incorporated herein by reference.

FIELD OF THE INVENTION

The present invention relates to optical fibres and fibre optic cables suitable for use in distributed fibre optic sensing, especially for use in distributed acoustic fibre optic sensing and to enhancements in the design, application and manufacture of optical fibre and/or fibre optic cable for distributed fibre optic sensors.

BACKGROUND OF THE INVENTION

Various sensors utilizing optical fibres are known. Many such sensors rely on fibre optic point sensors or discrete reflection sites such as fibre Bragg gratings or the like being arranged along the length of an optical fibre. The returns from the discrete point sensors or reflection sites can be analysed to provide an indication of the temperature, strain and/or vibration in the vicinity of the discrete sensors or reflection sites.

Fully distributed fibre optic sensors are also known in which the intrinsic scattering from a continuous length of optical fibre is used. Such sensors allow use of standard fibre optic cable without deliberately introduced reflection sites such fibre Bragg gratings or the like. The entire optical fibre from which a backscatter signal can be detected can be used as part of the sensor. Time division techniques are typically used to divide the signal returns into a number of time bins, with the returns in each time bin corresponding to a different portion of the optical fibre. Such fibre optic sensors are referred to as distributed fibre optic sensors as the sensor options are fully distributed throughout the entire optical fibre. As used in this specification the term distributed fibre optic sensor will be taken to mean a sensor in which the optical fibre itself constitutes the sensor and which does not rely on the presence of specific point sensors or deliberately introduced reflection or interference sites, that is an intrinsic fibre optic sensor.

U.S. Pat. No. 5,194,847 describes a distributed acoustic fibre optic sensor for intrusion sensing. A continuous optical fibre without any point sensors or specific reflection sites is used. Coherent light is launched into the optical fibre and any light which is Rayleigh backscattered within the optical fibre is detected and analysed. A change in the backscattered light in a time bin is indicative of an acoustic or pressure wave incident on the relevant portion of optical fibre. In this way acoustic disturbances any portion of the fibre can be detected.

GB patent application publication No. 2,442,745 describes a distributed acoustic fibre optic sensor system wherein acoustic vibrations are sensed by launching a plurality of groups of pulse modulated electromagnetic waves into a standard optical fibre. The frequency of one pulse within a group differs from the frequency of another pulse in the group. The Rayleigh backscattering of light from intrinsic reflection sites within the fibre is sampled and demodulated at the frequency difference between the pulses in a group.

U.S. Pat. No. 6,380,534 describes a distributed fibre optic strain and temperature sensing system which analyses the Brillouin back-scattering frequency distribution of light launched into the fibre to determine the temperature and strain along various portions of the sensing fibre, which may be embedded within a structure.

WO02/057805 describes the use of distributed fibre optic temperature, strain and/or acoustic sensors in a variety of applications including monitoring parameters of flow-lines in the oil and gas industry.

Distributed fibre optic sensing or distributed acoustic sensing (DAS) therefore provides useful and convenient sensing solutions that can monitor long lengths of optical fibre. Standard telecommunications optical fibre, e.g. single mode 125 µm optical fibre, can be used which means that the sensing fibre is relatively cheap and readily available and, in some instances, it may be possible to use existing optical fibres for acoustic monitoring say.

In some instances though the use of standard telecommunications fibre optic cable may not provide optimal sensing. It is therefore an aim of the present invention to provide improved optical fibre and fibre optic cables for use in distributed fibre optic sensing.

SUMMARY OF THE INVENTION

According to a first aspect of the present invention there is provided an optical fibre comprising a core, a cladding surrounding the core and a jacket surrounding the cladding wherein the core is offset from the centre of the optical fibre.

As the skilled person will appreciate, an optical fibre comprises a core, which is optically transmissive at the wavelength of operation, surrounded by cladding material which has a different refractive index to the core, the core and cladding together co-operating to guide optical radiation within the core of the fibre. The cladding is generally surrounded by a jacket material to protect the optical fibre. The jacket may include a buffer material between the cladding and the outer jacket. Standard optical fibres have the core in the centre of the fibre and are generally symmetrical in section, within manufacturing tolerances.

This aspect of the present invention provides an optical fibre in which the core is deliberately offset from the centre of the fibre, i.e. in section, the centre of core material is not co-incident with the centre of the fibre (or equivalently the geometric centre of the outer envelope of the fibre) as a whole. In other words the core of the optical fibre is contained within the circumference of the jacket material but is not concentric therewith. Such an arrangement can be advantageous when the optical fibre is used in a distributed fibre optic sensor such as a distributed acoustic sensor.

In a distributed acoustic fibre optic sensor such as described in GB2,442,745 optical radiation is transmitted into the optical fibre and any optical radiation which is Rayleigh back-scattered within the optical fibre is detected. Any incident acoustic signal causes mechanical vibration of the fibre which changes the amount of Rayleigh back-scattering at that part of the fibre. The variation in back-scatter is related to the movement of the optical fibre, in other words the amount of bending experienced by the optical fibre. Other distributed fibre optic vibration sensors also rely on bending of the optical fibre changing the amount of back-scatter from that portion of the optical fibre.

Clearly however it is the bending of the core and cladding which is responsible for the difference in back-scattering. In this present invention, by offsetting the core from the centre of the optical fibre the amount of bend experienced by the core can be maximised. Consider an optical fibre deployed in the ground running in a north-south direction. If an acoustic wave is incident on part of the fibre from the east this will cause part of the relevant part of the fibre to vibrate with a result that the fibre will bend in an east-west direction. As the fibre bends to the west the western side of the fibre will experience the greatest amount of bending. Similarly as the fibre bends to the east the eastern side of the fibre will experience the greatest amount of bending. In a standard optical fibre, where the core is in the middle of the fibre, the core will experience optical changes caused by bending but the amount of bending is less extreme that would be experienced at either the eastern or western edges of the fibre. In a fibre of the present invention the core is offset from the centre and thus is located closer to an edge of the optical fibre. If the optical fibre were deployed such that core were located along the eastern (or western) edge of the optical fibre then, in the scenario described above, the core would experience a greater amount of bending than were it located in the centre of the same fibre. Thus the optical fibre of the present invention can maximise the amount of bending experienced by the light guiding part of the fibre and hence maximise the optical return due to incident vibrations.

In certain embodiments it is helpful to consider the distribution of tensile stress and strain in a fibre under bending. In a conventional, axisymmetric fibre, the core lies along the centroidal axis, or neutral axis, and tensile stress and strain increase with distance from the neutral axis under bending. Embodiments of the present invention are arranged such that the centre of the core is offset from the neutral axis of the optic fibre. In this way, tensile stresses and strains experienced by the core can be increased compared to a conventional fibre undergoing equivalent bending. The offset can be defined according to predicted or desired bending and/or stresses and strains, and is desirably constant along an active sensing length of the fibre.

Preferably therefore the core is located to one side of optical fibre. The core is surrounded by the cladding (and hence clearly the cladding is also offset from the centre of the fibre) and the core and cladding may have the same dimensions as in a conventional optical fibre. However the core and cladding may be surrounded by a jacket and/or buffer material such that the core and cladding are located to one edge of the buffer/jacket material.

The jacket material of the optical fibre may be sufficiently large such that the centre of the optical fibre (in section) does not lie within the core material. In one embodiment the centre of the optical fibre does not lie with the cladding material either, i.e. the centre of the fibre lies within the jacket material or buffer material if present and thus the core and cladding is entirely located in one half of the optical fibre.

It should be noted that the optical fibre may comprise various layers of jacket material.

The optical fibre may comprise more than one buffer material, at least some buffer material being used as a filler material for the cable. At least some of the buffer material may be get. In one embodiment the optical fibre comprises a gel buffer disposed in the centre of the optical fibre with the core and cladding to one side of the gel buffer. Alternatively the core and cladding may disposed within a gel buffer material, possibly with an inner jacket layer around the cladding. In another embodiment there may be a solid buffer material in the centre of the optical fibre, surrounded by a gel buffer, with the core and cladding being disposed in the gel buffer. The present inventors have found that optical fibres having gel buffers show good response when used as sensing fibre in distributed acoustic sensors. It is believed that the gel buffer is better at coupling the acoustic waves to the optical fibre than solid buffers.

The optical fibre may also comprise a plurality of jacket layers and may comprise part of a fibre optic cable. As used herein the term optical fibre refers to a basis optical fibre having a core, cladding and a jacket or coating material. The term fibre optic cable shall be taken to mean an apparatus, which may comprise one or more optical fibres, and which has protective layers to protect the optical fibre(s) in use. A fibre optic cable may therefore comprise various outer jacket layers and/or strengthening fibres. In some embodiments therefore the optical fibre itself may comprise a fibre optic cable, whereas in other embodiments the optical fibre may be part of a fibre optic cable.

The fibre optic cable may thus comprise more than one optical fibre, for instance optical fibres intended for communication may be located in the same cable as the optical fibre intended for sensing. Preferably the sensing optical fibre is located towards the edge of the edge of the fibre optic cable. If the sensing optical fibre is firmly secured within the fibre optic cable the same considerations as discussed above apply and the sensing optical fibre will experience a greater bending effect if located towards the edge of the cable. Preferably the sensing optical fibre is oriented within the fibre optic cable such that the core of the sensing optical fibre is oriented with respect to the centre of the sensing optical fibre in the same way as the sensing optical fibre is located with respect to the centre of the cable. That is, if the sensing optical fibre is located toward the right hand side of the cable (i.e. a three o'clock position) then the core of the sensing fibre is also located towards the right of the sensing fibre (it also has a three 'o clock position).

In some embodiments the sensing optical fibre is located within the fibre optic cable in a helical arrangement. As mentioned above there may be benefits in locating the optical fibre away from the centre of the cable. In some embodiments it can be beneficial to ensure that the relative position of the optical fibre varies down the length of the cable so that the optical fibre describes a helix within the cable. This ensures that part of the sensing fibre is always disposed towards the side of the cable from which the acoustic wave is incident. Further a helical pattern may improve the beam pattern quality of the received signal. Also, the spatial resolution of the sensing portions of the fibre in use is determined by the interrogating radiation used in the sensor. However the spatial resolution of the sensor in the real world is also dependent on the arrangement of the cable. If the fibre is used in a sensor that provide spatial sensing portions that are 10 m long but the fibre itself is coiled into an area that is only 5 m long the actual spatial resolution of the fibre is 5 m. Thus the final arrangement of the cable can influence the spatial resolution. However in some applications it may be difficult to deploy a cable in anything other than a generally rectilinear fashion. For instance in a down well environment the cable may be forced downwell along with segments of casing and deploying a helical arrangement may not be possible. If however the cable itself contains a fibre wound in a desired helical arrangement then the cable itself can be rectilinear but the available spatial resolution may be increased by a helical arrangement of the fibre within the cable. For instance the fibre may be wound around a central element.

In use the vibrations induced in the optical fibre may occur in a range of transverse directions and thus the alignment of the optical fibre or fibre optic cable may not be critical, simply the fact that the core of the sensing optical fibre is located off-centre increases the general signal returns. However, in some embodiments it may be wished to primarily detect acoustic signals in a particular plane and in such a case it may be beneficial to ensure that the core is offset from the centre of the optical fibre in that plane. Thus to ease alignment the outer jacket of the optical fibre may be provided with a visual indication, such as a colouration or markings, indicating the side of the optical fibre to which the core is located.

Additionally or alternatively the outer jacket of the optical fibre may be shaped to ease alignment. For instance in section the optical fibre may have one slightly flattened side which is designed to be the base side of the optical fibre. The core of the optical fibre would be located with respect to the base side in a desired arrangement.

The optical fibre of this aspect of the present invention therefore offers increased sensitivity as compared to the use of a similarly sized optical fibre where the core is located in the centre of the fibre as it maximises the amount of optical disturbance experienced by the core of the fibre.

The principle of this aspect of the invention also applies to fibre optic cables in general. That is if a fibre optic cable comprises a plurality of optical fibres and at least one of those fibres is to be used as a sensing optical fibre it can be beneficial to ensure that the sensing fibre is an optical fibre which is located towards the edge of the fibre optic cable, even if the optical fibre itself is a conventional optical fibre. Thus, in another aspect of the invention, there is provided a distributed acoustic fibre optic sensor comprising an optical source coupled to a first optical fibre of a fibre optic cable to interrogate said first optical fibre with optical radiation and a detector coupled to said first optical fibre to detect radiation which is back-scattered from said first optical fibre wherein said fibre optic cable comprises a plurality of optical fibres and wherein the first optical fibre is located towards the edge of the fibre optic cable. Desirably the cross sectional alignment of the first optical fibre is controlled or maintained along an active sensing portion of the cable.

In other words, in a fibre optic cable having a plurality of optical fibres, an optical fibre near to the edge of the fibre optic cable, that is offset from the centre, is selected to be used as the sensing fibre in order to maximise the amount of bending experienced by the sensing optical fibre. In general this aspect of the present invention relates to the use of an optical fibre towards the edge of a fibre optic cable as a sensing fibre in a distributed fibre optic sensor.

In another aspect of the invention there is provided a distributed fibre optic sensor comprising an optical source coupled to an optical fibre to transit optical radiation into said fibre, a detector arranged to detect radiation back-scattered from said fibre and a processor to process the back-scattered radiation to provide a plurality of discrete longitudinal sensing portions of said fibre wherein the optical source is coupled to said optical fibre such that radiation transmitted into said fibre is offset from the centre of the core of the optical fibre.

In this embodiment of the invention the optical radiation is coupled into core of the fibre, i.e. the light guiding portion of the fibre, such that the radiation is offset from the centre of the core. Conventionally, optical radiation may be coupled into the fibre by focussing the incident light to the centre of the core region of the fibre for reasons of efficient coupling. However in the present invention the incident light is focussed not on the centre of the core region but towards the side of the core region. For a single mode fibre this means that the radiation will propagate with a greater intensity of light towards the edge of the core region of the fibre than at the side region of the fibre. In a similar manner as described above the edges of the core region will tend to have a greater variation in the amount of back-scatter produced under vibration than the central part of the core region and hence by transmitting the optical radiation through the edge of core region the back-scatter signal can be increased. This can improve the sensitivity of the distributed fibre optic sensor as compared to the coupling the interrogating radiation to the centre of the optical fibre. Deliberately offsetting the point of focus of the incident radiation away from the centre of the optical fibre would have generally been considered to potentially reduce efficient coupling and thus would normally be avoided.

The end of the optical fibre may be provided with a fibre optic connector and the fibre optic connector may be arranged to couple optical radiation to or from the optical fibre. The fibre optic coupler may comprise a lens. The point of focus of the fibre optic coupler may therefore be arranged to be offset from the centre of the core region of the optical fibre.

In another aspect of the present invention therefore there is provided an optical fibre comprising, at one end, a fibre optic coupler wherein the fibre optic coupler is arranged to couple optical radiation to or from the core region of the optical fibre, wherein the point of focus of the fibre optic coupler is offset from the centre of the core region of the optical fibre.

As described above the use of an optical fibre having a gel buffer material can improve the sensitivity of the optical fibre to acoustic vibrations as compared to an optical fibre without a gel buffer. Thus in another aspect of the present invention there is provided a distributed acoustic fibre optic sensor comprising an optical source coupled to a fibre optic cable to transit optical radiation into said fibre optic cable, a detector arranged to detect radiation Rayleigh back-scattered from said fibre optic cable wherein the fibre optic cable comprises at least one optical fibre and at least one gel filled region.

Fibre optic cables which use a gel buffer are known but the present invention relates to the use of a gel filled fibre optic cable in a distributed acoustic fibre optic sensor. Gel filled fibre optic cables have been found to exhibit a good sensitivity to acoustic signals as the gel filled fibre optic cable couples well to incident acoustic signals. The optical fibre, i.e. the core and cladding of the optical fibre may be disposed within the gel filled region or may be disposed adjacent the gel filled region.

The embodiments described above offer improved sensitivity when used in a distributed acoustic sensor as compared to the use of convention optical fibre. In another embodiment however the present invention allows for additional sensing functionality.

Thus according to a further aspect of the invention there is provided a fibre optic wherein the fibre optic has a stiffness in a first transverse direction that is greater than the stiffness in a second transverse direction, the second transverse direction being different to the first transverse direction.

The fibre optic may be an optical fibre with a varying stiffness or a fibre optical cable which includes an optical fibre.

In this embodiment of the present invention the fibre optic has a stiffness, i.e. flexural rigidity, that varies in the transverse direction, i.e. perpendicular to the longitudinal axis of the fibre. In other words the fibre optic will flex or bend in one direction more easily that it will flex or bend in the other direction. Preferably the first transverse direction is orthogonal to the second transverse direction.

As mentioned above in relation to the other aspects of the invention, distributed fibre optic sensors such as distributed acoustic sensors, detect the change in back-scatter radiation due to acoustic vibrations. The acoustic vibrations cause vibrations in the fibre optic which changes the optical properties of the light guiding portion of the fibre optic, thus varying the amount of back-scatter. A fibre optic which flexes readily in one direction (the second direction) will therefore be sensitive to acoustic signals which excite vibration of the fibre in that direction. However if the fibre optic does not readily flex in a different direction (the first direction), then acoustic waves which excite vibrations in that other direction will produce a limited response.

It can therefore be seen that be designing a fibre optic to flex preferentially in the second direction, i.e. have a bending stiffness that is greater in the first direction than the second direction, a sensor which respond preferentially to acoustic signals having a particular component can be achieved.

Imagine that the fibre optic has a very high stiffness in the first direction so that there is virtually no flexibility in that direction, but readily flexes in the second direction and that the first and second directions are orthogonal to one another. If such a cable were arranged vertically, in a vertical bore hole say, such that the first direction is aligned in a north-south direction and then used in a distributed acoustic sensor, the sensor would readily respond to acoustic or seismic signals which cause an east-west movement of the fibre optic cable but would not readily respond to signals which cause a north-south movement of the fibre. Such a sensor therefore effectively resolves the component of the incident acoustic wave parallel to the east-west direction. Were a second fibre optic of the same construction (or a different part of the first fibre optic) also deployed in the bore hole, but this time with the first direction aligned in an east-west direction, the second fibre optic (or different part of the first fibre optic) would effectively resolve the components of any incident acoustic wave into the components in the north-south direction. Thus is can be seen that two such fibre optics, or a careful arrangement of a single fibre optic, allows the components of an incident acoustic wave to be determined in two dimensions.

Preferably therefore the fibre optic has a large stiffness in the first direction such that the fibre optic does not readily flex in the first direction. Preferably the stiffness in the second direction is such that the fibre optic does readily flex in the second direction.

In one embodiment the fibre optic comprises at least one stiffening member, the at least one stiffening member having a stiffness that is greater in the first direction than the second direction. For instance the stiffening member may have a thickness in the first direction which is significantly greater than the thickness in the second direction. In other words the stiffening member is elongate in one transverse direction, e.g. a plate like member, and is arranged with it longer edge along the first direction. Bending in the first direction requires bending a lot of material and is therefore difficult whereas bending in the second direction involves bending only a relatively small amount of material and hence is easier.

Additionally or alternatively the at least one stiffening member may comprise a series of overlapping elements that can slide past each other in the second direction but can't slide past each other in the first direction.

In some embodiments the fibre optic may have an asymmetrical shape. For example the fibre optic may have a cross section that is wider in the first direction than the second direction. The fibre optic may, for example, have an elliptical type cross-section with the long axis of the ellipse defining the first direction. Again there is more material to bend in the first direction than the second direction leading to a greater stiffness.

In some embodiments the core and surrounding cladding region of the fibre optic are located towards the edge of the fibre optic in second direction. As described above in relation to the first aspect of the invention locating the core region of an optical fibre towards the edge of a fibre optic can increase the detected signal from such an optic fibre when used in a distributed fibre optic sensor. Clearly, in this embodiment, as the fibre optic is arranged to preferentially flex in the second direction the core region should be located towards the edge of the fibre optic in the second direction to maximise the bending effects.

As mentioned the fibre optic of this aspect of the invention may be used in a distributed fibre optic sensor to resolve incident waves into components in the first direction. Thus there may be a distributed fibre optic sensor comprising a first fibre optic according to this aspect of the invention, an optical source coupled to transmits optical radiation to the first fibre optic, a detector coupled to the first fibre optic to detect optical radiation back-scattered from the first fibre optic and a processor arranged to process the detected back-scattered radiation to provide a plurality of longitudinal sensing portions of the first fibre optic. In one embodiment the sensor may also comprise a second fibre optic according to this aspect of the invention. The second fibre is coupled to an optical source, which may or may not be the same optical source as is used for the first fibre optic, and a detector. The detector may be a separate detector to that used for the first fibre optic for ease of analysis, although the detector could be used for both fibre optics by using wavelength and/or time or code division multiplexing. The second fibre optic may be arranged such that the first direction of the first fibre optic is substantially parallel to the second direction of the second fibre optic. The processer receives data corresponding to the detected back-scatter from both fibre optics and may be arranged to determine the components of any incident disturbance in the first and second directions.

This sensor may be particularly applicable for use in well bores in the oil and gas industry and/or for seismic surveying or the like. For instance when performing fracturing in a well-bore it is desired to determine the location and density of the resultant fractures to provide most efficient extraction of the oil or gas. Being able to detect the incident pressure waves due to fracturing and resolve the components in two orthogonal environments allows for fracture density mapping in at least two dimensions. At least a second pair of fibre optics may be deployed in a different location to provide two dimensional mapping. The strength of the signals at various parts of the sensing fibre and time of arrival at different parts of the fibre may allow mapping in three dimensions. Alternatively another pair of fibre optics disposed perpendicularly to the long axis of the first pair of fibre optics could resolve the signals in three dimensions.

In down-well uses in particular, such as fracture mapping as described above or condition/flow monitoring or the like, the spatial length of the discrete sensing portions of the optical fibre should preferably be relatively short, for instance of the order of a few tens of centimetres or possibly less. In a distributed acoustic fibre optic sensor such as described in GB 2,442,745 the spatial resolution is related to the duration of an interrogating pulse. A shorter duration interrogating pulse means that a shorter length of optical fibre is illuminated at the same time and thus the effective minimum size of the longitudinal sensing portions is lower than were a longer duration pulse to be used.

However using shorter duration pulses means that less optical radiation is input into the optical fibre. As the skilled person will appreciate the interrogating radiation should be below a non-linear threshold for the optical fibre and thus there is a limit to the optical power that can be transmitted into the fibre. Thus, with a shorter interrogating pulse there is less light overall in the fibre, which means that there will be less back-scatter and, the range into the optical fibre beyond which no useable signal is returned will be shorter. Only a small proportion of the optical radiation which is transmitted into an optical fibre is back-scattered and not all of the radiation that is back-scattered is collected, some may be transmitted through the cladding and absorbed by the jacket or buffer material. The optical radiation which is directed back towards the detector will also be attenuated on the return path and thus small signals may be fully attenuated before reaching the end of the optical fibre.

It is therefore usual in distributed fibre optic sensing to use optical fibre having a core which exhibit low attenuation. As the goal for most telecommunications fibre is low attenuation of transmitted signals standard telecoms optical fibre therefore meets this criterion. Distributed fibre optic sensors have therefore used low loss conventional optical fibre such standard single mode 125 μm optical fibre.

The present inventors have realised however that use of optical fibre with an increased attenuation can actually be beneficial in some instances. Thus according to a further aspect of the invention there is provided a distributed fibre optic sensor comprising an optical source coupled to an optical fibre for transmitting optical radiation into the optical fibre and a detector coupled to the optical fibre to detect optical radiation back-scattered from the optical fibre wherein the optical fibre has a relatively high degree of inhomogenities and a relatively high numerical aperture.

By relatively high is meant greater than standard single mode 125 μm telecommunications optical fibre.

The present inventors have realised that attenuation in an optical fibre is partly linked to amount of inhomogenities in the optical fibre but that an increased amount of inhomogenities can result in a greater amount that backscattering. Ordinarily one would think that the benefit of increased back-scatter would be overcome by the detriment of increased attenuation—however, when coupled with the effect of a relatively high numerical aperture more of the backscattered radiation is collected and the overall result is that such an optical fibre provides a greater sensitivity than standard 125 μm single mode optical fibre, at least for relatively short ranges of sensing fibre. A greater sensitivity means that shorter duration pulses of interrogating radiation can be used, with a consequent reduction in the spatial length of each sensing portion of the fibre.

The present inventors have found that existing 80 μm fibre matches the criteria of having a greater amount of inhomogenities as compared to standard 125 μm single mode optical fibre. This leads to a greater degree of Rayleigh backscattering than for a conventional 125 μm optical fibre. The amount of attenuation of the back-scattered radiation also increases but this is offset by the fact that a greater proportion of back-scattered radiation is also coupled into the optical fibre. The net result is that, compared to a standard 125 μm single mode telecoms fibre, a greater amount of back-scatter radiation is detected for the same acoustic impulse and same interrogating radiation.

As mentioned above this effect is most pronounced for a range in the sensing fibre of up to about 5 km. Preferably therefore the optical fibre has a sensing length of the order of 5 km or less.

This aspect of the present invention therefore is particularly suited to down-well applications. Well-bores may typically be up to a few km in depth and the sensing equipment may usually be located close to the top of the bore-hole. Thus a sensing range of 5 km or so is adequate many down-well applications. The ability to provide a distributed sensor with a continuous array of sensing portions each of the order of a few tens of cms in length allows a large number of monitoring activities to be performed.

Thus in general this aspect of the present invention relates to the use of 80 μm optical fibre in a distributed acoustic fibre optic sensor in down-well detection and/or monitoring applications. The skilled person will appreciate that 80 μm optical fibre is currently available from speciality optical fibre producers. However optical fibres could be produced to provide a relatively large amount of inhomogenities per unit length and a high numerical aperture with different dimensions.

The invention extends to methods, apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

DESCRIPTION OF THE DRAWINGS

Preferred features of the present invention will now be described, purely by way of example, with reference to the accompanying drawings, in which.

DESCRIPTION OF THE INVENTION

Figure 1:
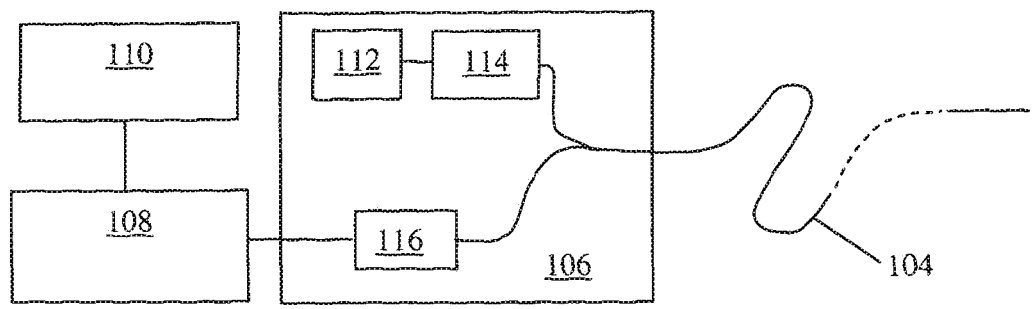
FIG. 1 illustrates the basic components of a distributed fibre optic sensor.

FIG. 1 shows a schematic of a distributed fibre optic sensing arrangement. A length of sensing fibre 104 is connected at one end to an interrogator 106. The output from interrogator 106 is passed to a signal processor 108, which may be co-located with the interrogator or may be remote therefrom, and optionally a user interface/graphical display 110, which in practice may be realised by an appropriately specified PC. The user interface may be co-located with the signal processor or may be remote therefrom.

The sensing fibre 104 can be many kilometres in length, and in this example is approximately 40 km long. The sensing fibre is a standard, unmodified single mode optic fibre such as is routinely used in telecommunications applications. In conventional applications of optical fibre distributed sensors the sensing fibre is at least partly contained within a medium which it is wished to monitor. For example, the fibre 104 may be buried in the ground to provide monitoring of a perimeter or monitoring of a buried asset such as a pipeline or the like.

The invention will be described in relation to a distributed acoustic sensor, although the skilled person will appreciate that the teaching may be generally applicable to any type of distributed fibre optic sensor.

In operation the interrogator 106 launches interrogating electromagnetic radiation, which may for example comprise a series of optical pulses having a selected frequency pattern, into the sensing fibre. The optical pulses may have a frequency pattern as described in GB patent publication GB 2,442,745 the contents of which are hereby incorporated by reference thereto. As described in GB 2,442,745 the phenomenon of Rayleigh backscattering results in some fraction of the light input into the fibre being reflected back to the interrogator, where it is detected to provide an output signal which is representative of acoustic disturbances in the vicinity of the fibre. The interrogator therefore conveniently comprises at least one laser 112 and at least one optical modulator 114 for producing a plurality of optical pulse separated by a known optical frequency difference. The interrogator also comprises at least one photodetector 116 arranged to detect radiation which is backscattered from the intrinsic scattering sites within the fibre 104.

The signal from the photodetector is processed by signal processor 108. The signal processor conveniently demodulates the returned signal based on the frequency difference between the optical pulses such as described in GB 2,442,745. The signal processor may also apply a phase unwrap algorithm as described in GB 2,442,745.

The form of the optical input and the method of detection allow a single continuous fibre to be spatially resolved into discrete longitudinal sensing portions. That is, the acoustic signal sensed at one sensing portion can be provided substantially independently of the sensed signal at an adjacent portion. The spatial resolution of the sensing portions of optical fibre may, for example, be approximately 10 m, which for a 40 km length of fibre results in the output of the interrogator taking the form of 4000 independent data channels.

In this way, the single sensing fibre can provide sensed data which is analogous to a multiplexed array of adjacent independent sensors, arranged in a linear path.

Conventional distributed fibre optic sensors use standard telecommunications optical fibre. The present invention provides enhancements to fibre optic cable design that improve the sensitivity or functionality of distributed fibre optic sensors.

FIG. 2 shows a cross section of an optical fibre 201 according to an embodiment of the invention. The optical fibre comprises an optical core 208 surrounded by a cladding material 206 as is usual in the field of optical fibres. The core 208 and cladding 206 may be produced by standard optical fibre production techniques and may for instance comprise pulled silica glass. Surrounding the core is a buffer material 202, again as is usually in manufacture of optical fibres. The buffer material is coated in a jacket material 204.

Unlike conventional optical fibres however, where the core and cladding are located in the centre of the optical fibre, in the embodiment shown in FIG. 1a the core and cladding are offset from the centre of the optical fibre. The core and cladding are located towards on edge of the optical fibre and, in the example shown, the centre of the optical fibre does not fall within either the core region or the cladding region.

By locating the core of the optical fibre towards side of the optical fibre, i.e. offsetting the core from the centre of the fibre, the signal from such a fibre when used as a distributed fibre optic sensor can be maximised. As will be appreciated, in a distributed fibre optic sensor which responds to mechanical movement of the optical fibre it is movement of the core and cladding parts of the optical fibre that lead to the change in optical signal. For a distributed acoustic sensor such as described in GB 2,442,745 the optical signal detected is radiation which has been Rayleigh back-scattered within the optical fibre. The greater the intensity of the acoustic signal the greater the change in detected back-scattered radiation.

Figure 3:
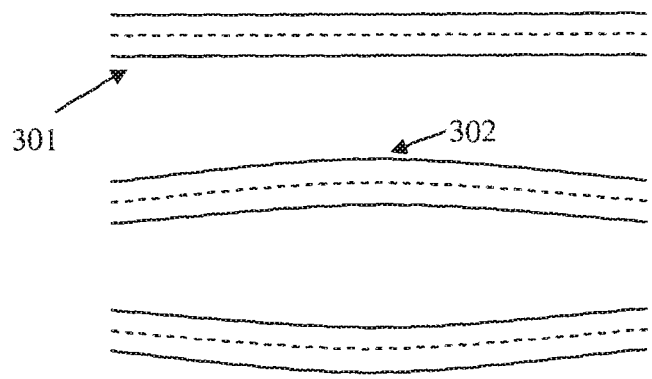
FIG. 3 illustrates the bending experienced by an optical fibre in response to an incident acoustic wave.

Referring to FIG. 3 a standard optical fibre 301 is illustrated. The centre of the fibre, which is where the core is usually located in a conventional optical fibre, is illustrated by the dotted line. The top drawings in FIG. 3 shows the fibre lying straight, such as it may be deployed in use. A mechanical vibration incident on the optical fibre may cause the optical fibre to vibrate, for example to oscillate in a transverse fashion. FIG. 3 shows the two extremes of the movement of the optical fibre in a transverse direction. It will be apparent that it is the outer parts of the optical fibre that experience the greatest bending. The actual degree of bending will depend on a number of factors including the elasticity of the fibre in the longitudinal direction but considering when the fibre has been displaced upwards (as shown on the page) it will be the top side of the fibre illustrated by arrow 302 which experiences the greatest amount of bending. The centre of the fibre will also experience bending, but not as much as the edges of the fibre.

Therefore, returning back to FIG. 2a, by arranging the light guiding portion 208 of the optical fibre towards the side of the optical fibre it is ensured that the bending effect be experienced by the core 208 and cladding 206 will be greater than were the core located at the centre of the fibre. This will lead to a greater signal return from the fibre for a given incident mechanical disturbance and hence the sensitivity of a distributed fibre optic sensor FIG. 2b shows another embodiment of an optical fibre according to the present invention. The optical fibre has a core and cladding region as described previous, located offset from the centre of the fibre. The fibre also has a jacket material 204. However in this embodiment the optical fibre has a first buffer material 202 which surrounds the core and cladding and a second buffer material 210 disposed in the centre of the optical fibre. At least one of the buffer materials 202 and 210 may be gel. In one embodiment the buffer material 202 is a gel and the central material 210 is a solid material to give the optical fibre some rigidity. In another embodiment however the central material 210 may be gel and the buffer material 202 may be solid.

The present inventors have found that gel filled fibre optic cable offers better performance, when used in a distributed acoustic fibre optic sensor, than non-gel filled cables as the presence of the gel helps couple the acoustic signals to the core.

Figure 2A:
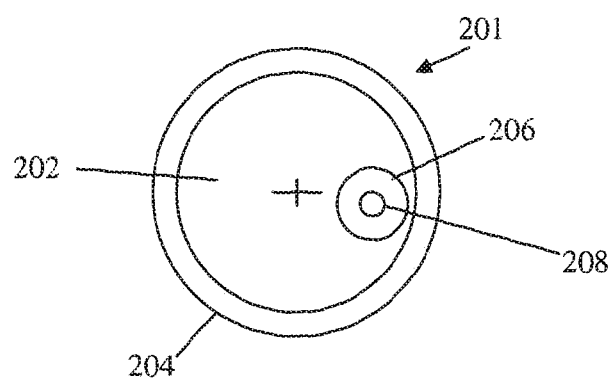
FIGS. 2a, 2b, 2c and 2d show embodiments of optical fibres according to an aspect of the present invention.
Figure 2B:
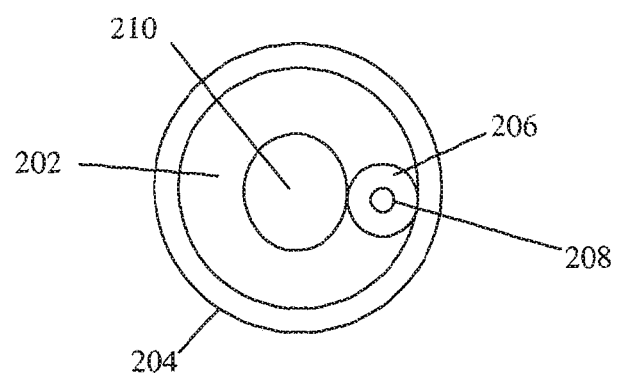
Figure 2C:
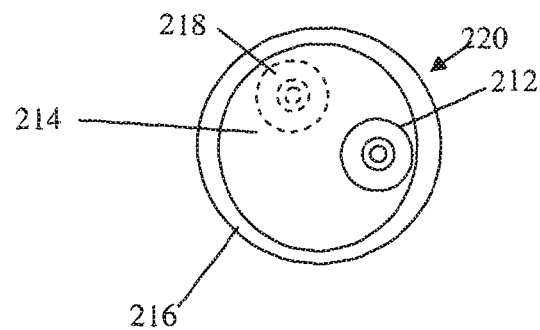

FIG. 2c shows another embodiment of the present invention. In this embodiment a standard optical fibre 212, comprising a core, material, cladding a buffer material and a coating, is disposed with a fibre optic cable 220. In this embodiment the core of the optical fibre 212 is located in the centre of the optical fibre but the optical fibre itself is located towards the edge of the fibre optic cable as a whole. The fibre optic cable comprises a protective jacket 216 and a filler material 214. In some embodiments the fibre optical cable may comprise more than one optical fibre 218. The additional optical fibres 218 may be used for optical communications through the fibre optic cable whilst the optical fibre 112 is used for optical sensing in a distributed fibre optic sensor.

In certain embodiments, such as those shown in FIGS. 2a-2c, the arrangement of the core in relation to the centre of the cable is substantially constant along the cable.

Figure 2D:
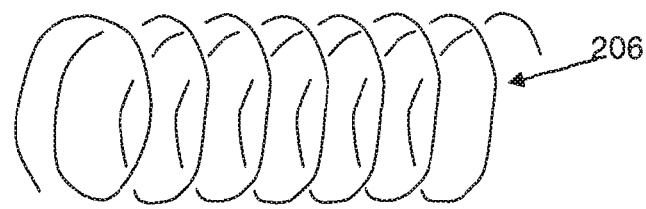

In other embodiments however the optical fibre may be arranged in a helical pattern within the cable, i.e. the position of the optical fibre within the cable varies along the length of the cable. FIG. 2d illustrates the arrangement of the optical fibre within the cable, with the cable jacket and buffer material omitted for clarity. Where the cable has a solid central material the optical fibre may be wound around the solid core.

It will be clear that over the course of a few metres of cable a helical winding will mean that the optical fibre is disposed on all sides of the centre of the cable. Thus no matter which direction an acoustic wave is incident from at least part of the optical fibre will be subject to the maximum extent of bending. A helical arrangement thus avoids the need to avoid laying the cable in a particular orientation.

Further the pitch of the helix may be chosen to provided a desired spatial resolution. In use the fibre is interrogated with radiation pulses of particular duration and the duration of the pulse may define the length, in the fibre, of each sensing portion. The minimum length of the sensing portion may in part be determined by the overall length of fibre being interrogated, as the interrogating pulses which define the size of the sensing portion may need to be of a minimum duration to ensure acceptable returns from the end of the fibre. The spatial resolution of the sensor itself however depends on how the fibre is arranged. Using a helical winding, a given length of cable may correspond to a greater length of optical fibre, thus improving the spatial resolution of the ultimate sensor.

Figure 6A:
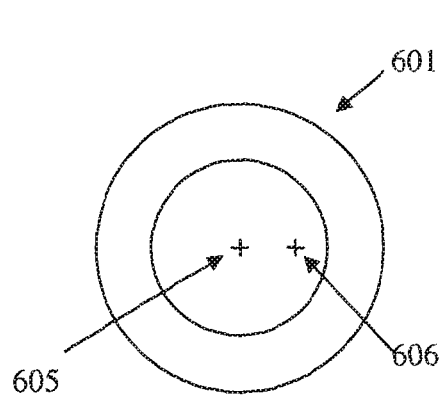
FIGS. 6a and 6b illustrate an embodiment for coupling optical radiation to an optical fibre offset from the centre of the fibre.
Figure 6B:
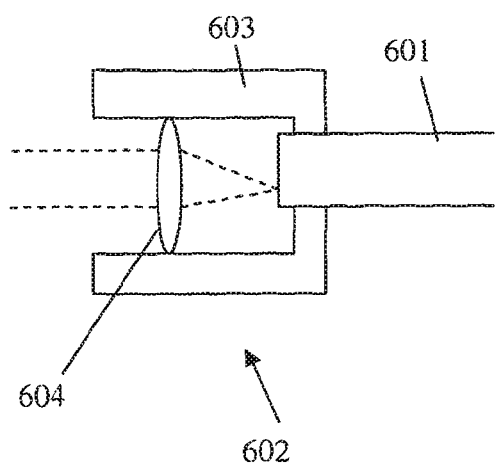

FIGS. 6a and 6b show another embodiment of the present invention. In this embodiment an optical fibre 601, which may be a conventional optical fibre, has at one end, a fibre optic connector 602. Fibre optic connecting devices are known for focussing radiation to or from an optical fibre. In use the fibre optic connector may be connected to a splitter or circulator for passing radiation to be transmitted to the fibre and directing back-scattered radiation to the detector. In this embodiment fibre optic connector 602 comprises a lens 603 and a housing 604 which holds the lens in place relative to the end of the optical fibre 601.

Conventionally the lens is arranged to focus radiation to the centre of the optical fibre, i.e. point 605 illustrated in the cross section of FIG. 6a. In the present invention however the fibre optic coupler is arranged to focus radiation into the optical fibre offset from the centre of the fibre, e.g. at position 606. In this way the radiation will be coupled into the optical fibre at the edge of the core region and the maximum intensity of light with the core will be at the edge of the core. As described above the bending experienced at the edge of the core will be generally greater than that at the centre of the core and hence by coupling the radiation into the fibre such that the maximum intensity is at the edges of the core, the amount of back-scatter can be maximised.

Figure 4:
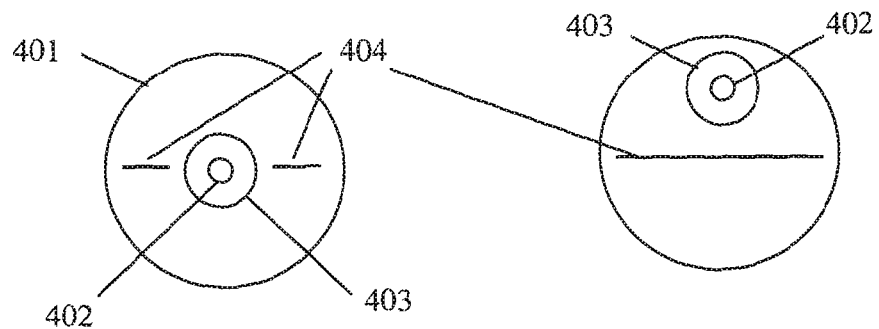
FIG. 4 shows two embodiments of an optical fibre according to another aspect of the invention.

Turning now to FIG. 4, two embodiments according to a different aspect of the invention are shown. An optical fibre 401 comprises an optical core region 402 and cladding region 403 as described above. In each case however the optical fibre comprises one or move stiffening members 404 which act to provide stiffness to the optical fibre in one preferential direction only. The stiffness members comprise flat structures that run throughout the length of the fibre and are arranged so that their thick edges are all aligned. In FIG. 4 the thick edge of each member is shown as being aligned horizontally. The stiffness member may comprise a thin strip of metal or plastic and acts to provide a resistance to flexing in one direction, in this instance the horizontal left-to-right direction, whilst allowing movement in the other direction, in this instance the vertical direction. It will be appreciated that a thin, strip like member of a relatively flexible material orientated as shown in FIG. 4 may be easily bent up and down without much resistance but may not easily flex from side to side. Thus the stiffness member acts to provide the optical fibre with a preferred direction of movement. The fibre may be relatively easily flexed in the vertical direction but will not easily be flexed in the horizontal direction.

The embodiments of shown in FIG. 4 may therefore be used to preferentially respond to incident disturbances in the vertical direction. This may allow the components of an incident wave to be resolved in the vertical direction. For example if a pressure wave is incident on either of the fibres shown in FIG. 4 from the left or the right the wave may induce very little movement of the fibres and hence there would be very little change in the back-scattered radiation. A pressure wave incident from the top or bottom would cause the fibre to vibrate (as illustrated in FIG. 3). This would result in a change to the amount of back-scattered radiation which would be detected as a disturbance of the fibre. A pressure wave incident from a direction which is 45° to the vertical would cause a certain amount of vibration in the up and down direction due to the component of the incident wave in the up and down direction.

Figure 5:
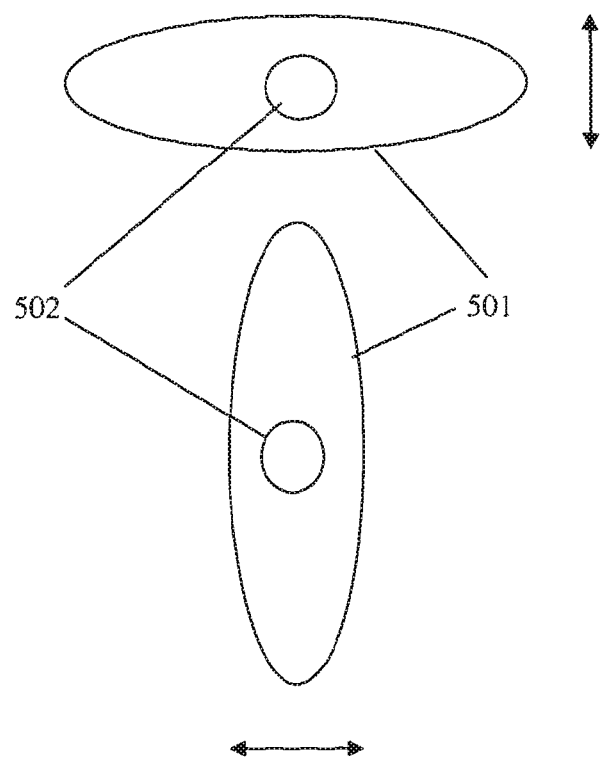
FIG. 5 shows a further embodiment of a fibre optic of the present invention.

By arranging two such fibres that each preferential responds in a single dimension only, and arranging the preferential direction of motion to be orthogonal in each fibre, an incident disturbance, i.e. an acoustic wave, can be resolved into two orthogonal components, as illustrated in FIG. 5. FIG. 5 shows another embodiment of fibre optic cable. FIG. 5 shows two fibre optic cables 501 of identical design. Each fibre optic cable has an optical fibre 502, which comprises an optical core and cladding and may optionally comprise at least one buffer and/or at least one jacket material as described previously. Surrounding the optical fibre is material of the cable. The cable has a cross sectional shape which is wider in one direction than the other, in this instance an elliptical shape. Thus each fibre will preferentially bend in the direction of the short axis and will be resistant to bending in the direction of the long axis. Optionally the cable could comprise stiffening members as described above to further prevent movement in the direction of the long axis.

The two fibres are arranged relatively close to one another and substantially parallel and are aligned so that the preferential direction of vibration of one fibre (illustrated by the arrows) is orthogonal to that of the other fibre. Any incident acoustic wave (which shall be taken to mean any type of incident pressure wave, including seismic waves) which has a component perpendicular to the general axis that the fibres extend along will thus be resolved into orthogonal components by the two fibres. Such an arrangement can be useful in seismic surveying and especially in down-well applications for instance for detecting and mapping fractures.

Each feature disclosed in the description, and (where appropriate) the claims and drawings may be provided independently or in any appropriate combination.

The invention claimed is:

1. An optical fibre comprising a core, a cladding surrounding the core and a jacket surrounding the cladding further comprising at least one buffer material filling a space between the cladding and jacket wherein the core is offset from the centre of the optical fibre, and wherein the optical fibre is adapted such that it readily flexes in response to an incident acoustic wave, wherein a gel buffer disposed in the centre of the optical fibre with the core and cladding to one side of the gel buffer.

* * * * *